Figure 1:
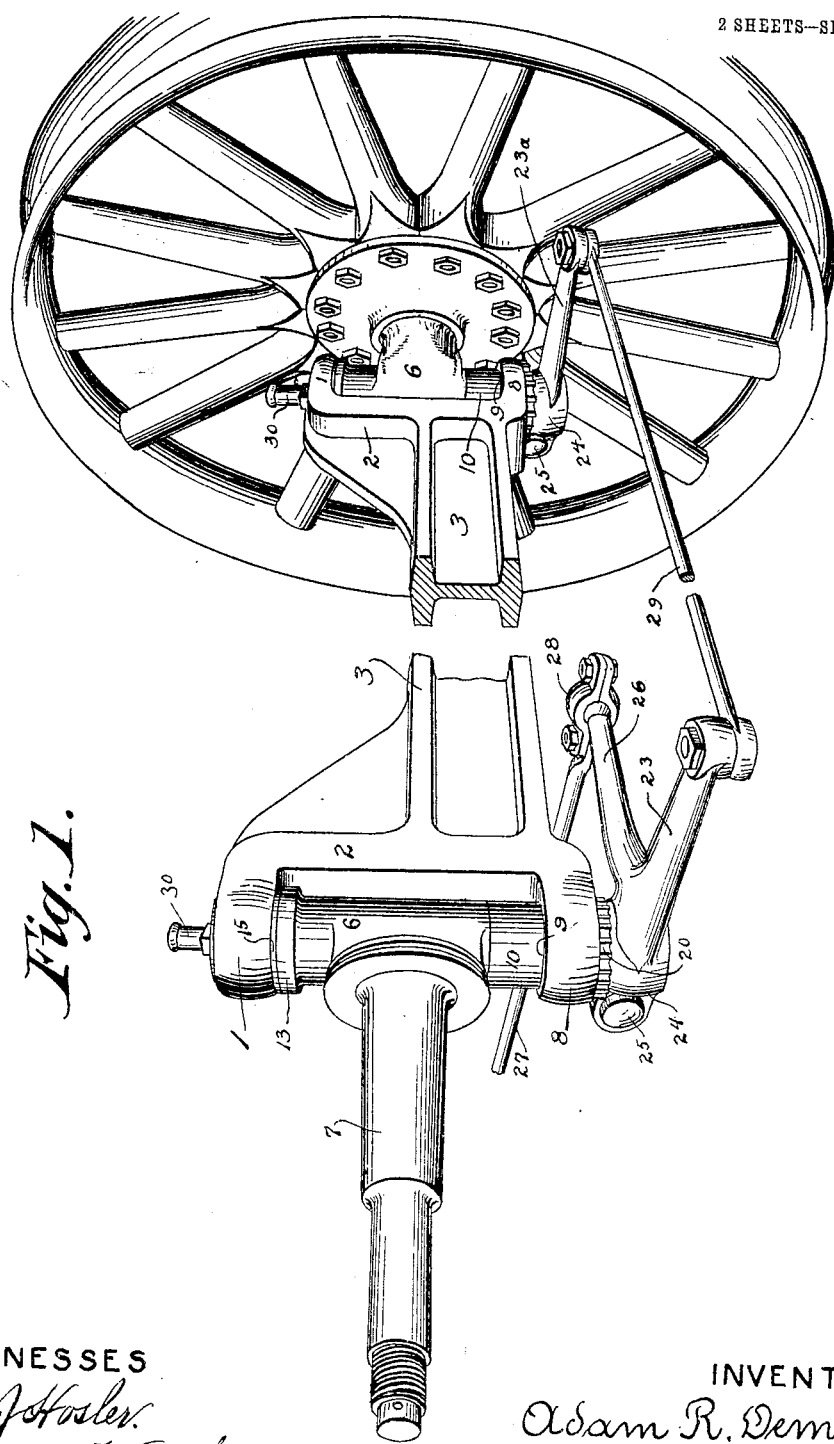

No. 805,716. PATENTED NOV. 28, 1905.
A. R. DEMORY.
AUTOMOBILE AXLE.
APPLICATION FILED JULY 10, 1905.

2 SHEETS—SHEET 1.

WITNESSES
Jos. J. Hosler.
Minnie F. Anthony

INVENTOR
Adam R. Demory,
BY
Harry Frease
ATTORNEY

No. 805,716. PATENTED NOV. 28, 1905.
A. R. DEMORY.
AUTOMOBILE AXLE.
APPLICATION FILED JULY 10, 1905.
2 SHEETS—SHEET 2.
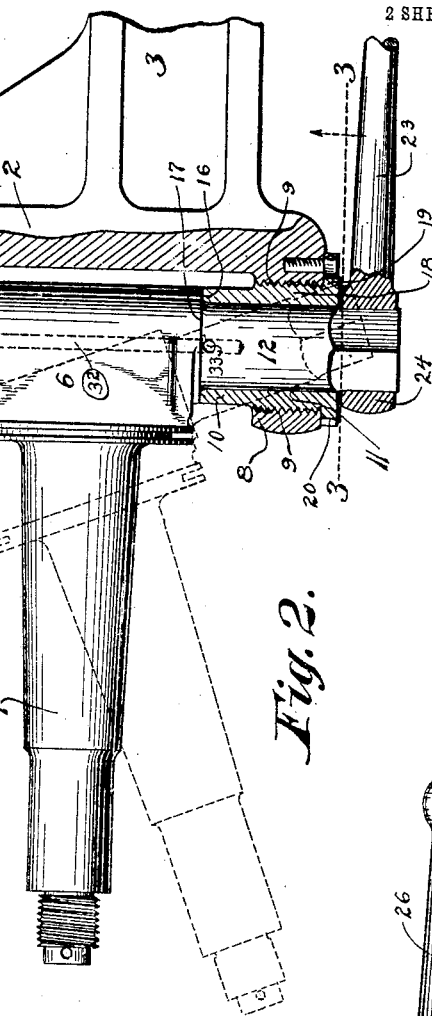
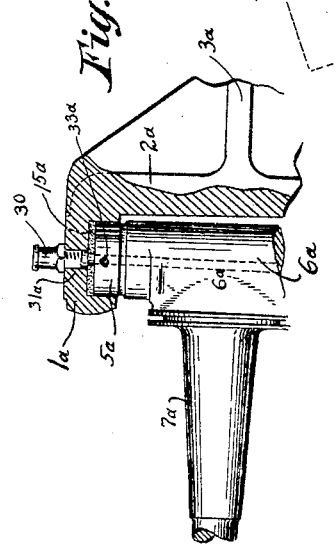
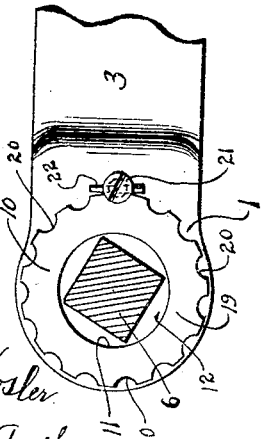
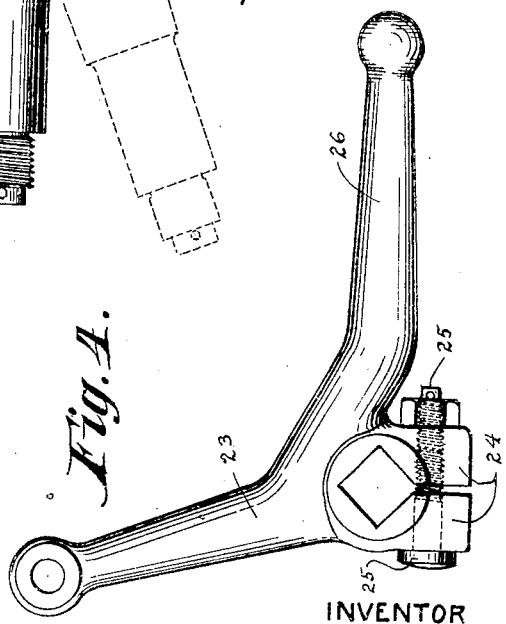
WITNESSES
Jas. J. Hosler
Minnie F. Anthony
INVENTOR
Adam R. Demory
BY
Harry Frease
ATTORNEY

UNITED STATES PATENT OFFICE.

ADAM R. DEMORY, OF CANTON, OHIO, ASSIGNOR TO THE TIMKEN ROLLER BEARING AXLE COMPANY, OF CANTON, OHIO, A CORPORATION.

AUTOMOBILE-AXLE.

No. 805,716.  Specification of Letters Patent.  Patented Nov. 28, 1905.

Application filed July 10, 1905. Serial No. 268,915.

*To all whom it may concern:*

Be it known that I, ADAM R. DEMORY, a citizen of the United States, residing at Canton, in the county of Stark and State of Ohio, have invented a new and useful Improvement in Automobile-Axles, of which the following is a specification.

The invention relates to the forward axle of an automobile or other vehicle in which the spindles are hinged on the ends of the axle-bar; and the general object of the improvement is to provide a pivotal connection for the spindles with the bar in which the pivot-journals are integral with the spindle and extend to a greater length than the distance between the jaws in the yoke on the end of the axle-bar, in which jaws are formed continuous bearings for the journals, whereby the pivot-journals can be extended outside of the yoke-jaws for the connection of the operating parts. This object is attained by the construction and arrangement illustrated in the accompanying drawings, in which—

Figure 1 is a perspective view of the end parts of the axle, showing the spindles pivoted thereto and with one wheel removed; Fig. 2, an elevation of the end of the axle with the spindle pivoted therein, showing the yoke and bushing-bearing in section; Fig. 3, an under side view of the yoke on line 3 3, Fig. 2; Fig. 4, an under side view of the bell-crank, and Fig. 5 a fragmentary view showing an alternate form for the upper jaw and the journal-bearing therein.

Similar numerals refer to similar parts throughout the drawings.

In the upper jaw 1 of the yoke 2 of the axle-bar 3 is formed the bearing 4 for the upper journal 5 of the cross-pivot 6 on the inner end of the spindle 7, and in the lower jaw 8 of the yoke is provided the enlarged aperture 9, which is preferably threaded and into which is entered from outside the elongated bushings 10, in which bushing is formed the bearing 11 for the lower journal 12 of the pivot. As the load of the vehicle is carried on the pivot by the upper jaw of the yoke, the upper part of the body of the pivot is preferably enlarged, as by the annular flange 13, to form the considerable shoulder 14, and the washer 15, which may be of fibrous material, is preferably provided between this shoulder and the upper jaw of the yoke which is supported thereon, or the bearing of the jaw $1^a$ may be directly on the end of the journal $5^a$ with the intervening washer $15^a$, as shown in Fig. 5.

The lower journal of the pivot is somewhat elongated, so that before the bushing-bearing is inserted in its aperture this journal can be entered downward in this aperture until the upper journal can be passed under the upper jaw of the yoke and then moved directly upward into its bearing, the position preliminary to this insertion being shown by broken lines in Fig. 3. After the pivot is thus entered in the yoke the bushing-bearing is applied from outside around the lower journal and inserted in its aperture and the parts are so arranged that the upper end 16 of the bushing may abut against the annular shoulder 17, formed by the body of the pivot above the lower journal thereof, and thus hold the bearing proper of the pivot against the upper jaw of the yoke or the intervening washer, and it is evident that a proper adjustment of the bushing will take up any endwise looseness there may be of the pivot in the yoke; but these features are not essential, and the head 18 of the bushing-bearing may be enlarged, as at 19, with the notches 20 in the periphery thereof, and the bushing can be held in proper adjustment by means of the screw 21, turned into the lower jaw of the yoke, with its head entered into one of these notches, and the key 22 may be passed through the head of the screw; but these means for locking the bushing-bearing are not essential to the other features of construction. The lower journal of the pivot is also elongated downward, so as to project outside of the bushing-bearing, and this projection is preferably squared, and the steering-arms 23 and $23^a$ are attached thereon, preferably, by means of the integral clamp-collar 24 and bolt 25. The operating-arm 26 is preferably formed integral with the steering-arm 23 on the clamp-collar, thus forming a bell-crank, and the steering-rod 27 is connected to the free end of the operating-arm in the usual manner by the universal joint 28, and the steering-arms are joined in the usual manner by the connecting-bar 29. The cup 30 may be inserted through the central aperture 31 in the upper jaw of the yoke, and oil or other lubricant can be fed to the respective journals through the vertical port 32 and the transverse ports 33 in the pivot.

What I claim as my invention, and desire to secure by Letters Patent, is—

1. A pivotal connection for an axle and a spindle comprising a yoke on the one having a bearing and an aperture in its respective jaws, an adjustable bushing having a bearing therein and adapted to be entered and locked in the aperture, and a cross-pivot on the other having journals adapted to be entered and to operate in the respective bearings, there being shoulders on the pivots adapted to abut against the bearings.

2. A pivotal connection for an axle and a spindle comprising a yoke on the one having a bearing and an aperture in its respective jaws, a bushing having a bearing therein and adapted to be entered in the aperture, and a cross-pivot on the other having journals adapted to be entered and to operate in the respective bearings.

3. A pivotal connection for an axle and a spindle comprising a yoke on the one having a bearing and an aperture in its respective jaws, a bushing having a bearing therein and adapted to be entered in the aperture, and a cross-pivot on the other having journals adapted to be entered and to operate in the respective bearings, one of the journals being extended and having means for attaching operative parts thereon outside of its bearing.

In testimony whereof I have signed my name to this specification in the presence of two subscribing witnesses.

ADAM R. DEMORY.

Witnesses:
  G. A. KIMBARK,
  MINNIE F. ANTHONY.